United States Patent
Kolde et al.

(10) Patent No.: US 8,099,680 B1
(45) Date of Patent: Jan. 17, 2012

(54) SYSTEM AND METHOD OF CONTEXTUAL PRE-TUNING

(75) Inventors: Hubert E. Kolde, Mercer Island, WA (US); James A. Billmaier, Woodinville, WA (US); John M. Kellum, Seattle, WA (US); Dewey Reid, San Rafael, CA (US); Philip Rogan, Bozeman, MT (US)

(73) Assignee: ARRIS Group, Inc., Suwanee, GA (US)

( * ) Notice: Subject to any disclaimer, the term of this patent is extended or adjusted under 35 U.S.C. 154(b) by 1495 days.

(21) Appl. No.: 10/328,514

(22) Filed: Dec. 23, 2002

Related U.S. Application Data (63) Continuation-in-part of application No. 10/097,174, filed on Mar. 12, 2002, now abandoned, and a continuation-in-part of application No. 10/113,820, filed on Mar. 29, 2002, now Pat. No. 7,055,104.

(51) Int. Cl.
*G06F 3/048* (2006.01)
*G09G 5/00* (2006.01)

(52) U.S. Cl. ............ 715/835; 715/719; 715/838; 725/39

(58) Field of Classification Search .................. 715/738, 715/760, 764, 767, 781, 784, 810, 835, 838; 725/37, 39, 44, 45, 46, 47, 48, 52, 54
See application file for complete search history.

(56) References Cited

U.S. PATENT DOCUMENTS

| | | | |
|---|---|---|---|
| 5,398,074 A | 3/1995 | Duffield et al. | |
| 5,524,195 A | 6/1996 | Clanton, III et al. | |
| 5,583,560 A | 12/1996 | Florin et al. | |
| 5,602,596 A | 2/1997 | Claussen et al. | |
| 5,606,374 A | 2/1997 | Bertram | |
| 5,621,456 A | 4/1997 | Florin et al. | |
| 5,623,613 A | 4/1997 | Rowe et al. | |
| 5,633,657 A | 5/1997 | Falcón | |
| 5,663,757 A | 9/1997 | Morales | |
| 5,673,401 A | 9/1997 | Volk et al. | |
| 5,677,708 A | 10/1997 | Matthews, III et al. | |
| 5,682,511 A | 10/1997 | Sposato et al. | |
| 5,781,872 A | 7/1998 | Konishi et al. | |
| 5,812,124 A | 9/1998 | Eick et al. | |
| 5,838,326 A | 11/1998 | Card et al. | |
| 5,850,218 A | 12/1998 | LaJoie et al. | |
| 5,926,230 A * | 7/1999 | Niijima et al. | 725/56 |
| 6,002,394 A | 12/1999 | Schein et al. | |
| 6,005,601 A | 12/1999 | Ohkura et al. | |
| 6,020,930 A | 2/2000 | Legrand | |
| 6,028,600 A | 2/2000 | Rosin et al. | |
| 6,037,933 A | 3/2000 | Blonstein et al. | |

(Continued)

OTHER PUBLICATIONS

Nokia Mediaterminal 511S: www.nokia.com/multimedia/pdf/mediaterminal.pdf; pp. 1-12, Dec. 11, 2001.

(Continued)

*Primary Examiner* — Xiomar L Bautista
(74) *Attorney, Agent, or Firm* — Troy A. Van Aacken; Robert J. Starr (57) ABSTRACT

A method implemented on a multi-tuner receiver system comprises successively displaying a set of visual cards where each visual card of the set of visual cards comprises a graphical representation. A visual card of the set of visual cards is selected, the visual card being associated with a first television program. Based on a characteristic of the selected visual card, a second television program is identified. The second television program is then tuned.

35 Claims, 6 Drawing Sheets

U.S. PATENT DOCUMENTS

| | | | |
|---|---|---|---|
| 6,118,492 | A | 9/2000 | Milnes et al. |
| 6,151,059 | A | 11/2000 | Schein et al. |
| 6,163,345 | A | 12/2000 | Noguchi et al. |
| 6,175,362 | B1 | 1/2001 | Harms et al. |
| 6,177,931 | B1 | 1/2001 | Alexander et al. |
| 6,188,406 | B1 | 2/2001 | Fong et al. |
| 6,201,540 | B1 | 3/2001 | Gallup et al. |
| 6,262,722 | B1 | 7/2001 | Allison et al. |
| 6,266,059 | B1 | 7/2001 | Matthews, III et al. |
| 6,266,098 | B1 | 7/2001 | Cove et al. |
| 6,281,940 | B1 | 8/2001 | Sciammarella |
| 6,313,851 | B1 | 11/2001 | Matthews, III et al. |
| 6,344,880 | B1 | 2/2002 | Takahashi et al. |
| 6,415,438 | B1 | 7/2002 | Blackketter et al. |
| 6,418,556 | B1 | 7/2002 | Bennington et al. |
| 6,425,129 | B1 | 7/2002 | Sciammarella et al. |
| 6,445,306 | B1 | 9/2002 | Trovato et al. |
| 6,481,011 | B1 | 11/2002 | Lemmons |
| 6,522,342 | B1 | 2/2003 | Gagnon et al. |
| 6,535,888 | B1 | 3/2003 | Vijayan et al. |
| 6,538,672 | B1 | 3/2003 | Dobbelaar |
| 6,564,378 | B1 | 5/2003 | Satterfield et al. |
| 6,577,350 | B1 | 6/2003 | Proehl et al. |
| 6,613,100 | B2 | 9/2003 | Miller |
| 6,642,939 | B1 | 11/2003 | Vallone et al. |
| 6,678,891 | B1 | 1/2004 | Wilcox et al. |
| 6,690,391 | B1 | 2/2004 | Wilcox et al. |
| 6,698,021 | B1 | 2/2004 | Amini et al. |
| 6,725,215 | B2 | 4/2004 | Yamamoto |
| 6,728,675 | B1 | 4/2004 | Maddalozzo, Jr. et al. |
| 6,756,997 | B1 | 6/2004 | Ward, III et al. |
| 6,789,263 | B1 | 9/2004 | Shimada et al. |
| 6,870,573 | B2 | 3/2005 | Yeo et al. |
| 6,910,191 | B2 | 6/2005 | Segerberg et al. |
| 6,924,822 | B2 | 8/2005 | Card et al. |
| 6,976,228 | B2 | 12/2005 | Bernhardson |
| 7,051,291 | B2 | 5/2006 | Sciammarella et al. |
| 7,065,710 | B2 | 6/2006 | Hayashi et al. |
| 7,260,829 | B1 | 8/2007 | Hendricks et al. |
| 7,434,245 | B1 * | 10/2008 | Shiga et al. ............... 725/43 |
| 7,765,568 | B1 * | 7/2010 | Gagnon et al. ............ 725/38 |
| 2002/0054068 | A1 | 5/2002 | Ellis et al. |
| 2002/0078440 | A1 | 6/2002 | Feinberg et al. |
| 2002/0152474 | A1 | 10/2002 | Dudkiewicz |
| 2002/0174444 | A1 | 11/2002 | Gatto et al. |
| 2003/0090524 | A1 | 5/2003 | Segerberg et al. |
| 2005/0172319 | A1 | 8/2005 | Reichardt et al. |

OTHER PUBLICATIONS

Nokia Mediamaster 9470S; http://www.digitiv.de/ifa01/nokia9470s.shtml; pp. 1-2; Dec. 11, 2001.
U.S. Appl. No. 10/108,178, filed Mar. 27, 2002, for Billmaier et al.
U.S. Appl. No. 10/113,889, filed Mar. 29, 2002, for Billmaier et al.
U.S. Appl. No. 10/107,601, filed Mar. 27, 2002, for Billmaier et al.
U.S. Appl. No. 10/186,209, filed Jun. 27, 2002, for Istvan et al.
U.S. Appl. No. 10/186,210, filed Jun. 27, 2002, for Billmaier et al.
U.S. Appl. No. 10/260,700, filed Sep. 30, 2002, for Billmaier et al.
U.S. Appl. No. 10/260,208, filed Sep. 30, 2002, for Billmaier et al.
U.S. Appl. No. 10/328,754, filed Dec. 23, 2002, for Rappaport et al.
U.S. Appl. No. 10/186,094, filed Jun. 29, 2002, for Billmaier et al.
U.S. Appl. No. 10/260,366, filed Sep. 20, 2002, for Allen et al.
U.S. Appl. No. 10/260,881, filed Sep. 30, 2002, for Allen et al.
U.S. Appl. No. 10/320,900, filed Dec. 16, 2002, for Kolde et al.
U.S. Appl. No. 10/328,514, filed Dec. 23, 2002, for Kolde et al.
U.S. Appl. No. 10/259,199, filed Sep. 27, 2002, for Young et al.
Office Action mailed Dec. 13, 2007, for U.S. Appl. No. 10/186,209, filed Jun. 27, 2002.
Office Action mailed Dec. 13, 2007, for U.S. Appl. No. 10/186,210, filed Jun. 27, 2002.
Office Action mailed Dec. 13, 2007, for U.S. Appl. No. 10/113,889, filed Mar. 29, 2002.
Office Action mailed Dec. 26, 2007, for U.S. Appl. No. 10/105,088, filed Mar. 22, 2002.
Office Action mailed Jan. 24, 2008, for U.S. Appl. No. 10/108,178, filed Mar. 27, 2002.
Office Action mailed Jan. 22, 2008, for U.S. Appl. No. 10/260,738, filed Sep. 30, 2002.
Office Action mailed Mar. 5, 2008, for U.S. Appl. No. 10/328,754, filed Dec. 23, 2002.
Office Action mailed Oct. 19, 2006, for U.S. Appl. No. 10/097,174, filed Mar. 12, 2002.
Office Action mailed May 4, 2007, for U.S. Appl. No. 10/097,174, filed Mar. 12, 2002.
Office Action mailed Jan. 11, 2007, for U.S. Appl. No. 10/105,088, filed Mar. 22, 2002.
Office Action mailed Jul. 6, 2007, for U.S. Appl. No. 10/105,088, filed Mar. 22, 2002.
Office Action mailed Jun. 13, 2007, for U.S. Appl. No. 10/108,178, filed Mar. 27, 2002.
Office Action mailed Jan. 3, 2007, for U.S. Appl. No. 10/113,889, filed Mar. 29, 2002.
Office Action mailed Jun. 15, 2007, for U.S. Appl. No. 10/113,889, filed Mar. 29, 2002.
Office Action mailed Nov. 29, 2006, for U.S. Appl. No. 10/107,601, filed Mar. 27, 2002.
Office Action mailed Jun. 20, 2007, for U.S. Appl. No. 10/107,601, filed Mar. 27, 2002.
Office Action mailed May 24, 2007, for U.S. Appl. No. 10/186,209, filed Jun. 27, 2002.
Office Action mailed Jul. 5, 2007, for U.S. Appl. No. 10/186,210, filed Jun. 27, 2002.
Office Action mailed Jun. 29, 2007, for U.S. Appl. No. 10/328,754, filed Dec. 23, 2002.

* cited by examiner

SYSTEM AND METHOD OF CONTEXTUAL PRE-TUNING

CROSS-REFERENCE TO RELATED APPLICATION(S)

The present application is a continuation-in-part of U.S. patent application Ser. No. 10/097,174, filed Mar. 12, 2002 now abandoned, for "System and Method for Focused Navigation within an Interactive Television User Interface", which application is incorporated herein by reference in its entirety. The present application is also a continuation-in-part of U.S. patent application Ser. No. 10/113,820, filed Mar. 29, 2002 now U.S. Pat. No. 7,055,104, for "System and Method for Focused Navigation Using Filters", which application is incorporated herein by reference in its entirety.

BACKGROUND OF THE INVENTION

Recent advances in technology have vastly increased the number of available options within personal computers (PCs), interactive television (ITV) systems, personal digital assistants (PDAs), cellular telephones, and other information systems. For instance, current ITV systems offer hundreds of broadcast channels and a variety of interactive options, including e-mail, videoconferencing, instant messaging, online banking, online purchasing, and so forth.

Many current television systems employ multi-tuner receivers that allow such utilities as picture-in-picture viewing and digital video recording. However, the user of such a television system often employs only one of the tuners in order to view a program, thereby leaving one or more additional tuners unused. When the user subsequently changes channels, the user often experiences latency associated with tuning to the new channel, thereby delaying user viewing of the selected programming.

BRIEF DESCRIPTION OF SEVERAL VIEWS OF THE DRAWING

Non-exhaustive embodiments of the invention are described with reference to the figures, in which.

DETAILED DESCRIPTION OF THE INVENTION

Reference throughout this specification to "one embodiment" or "an embodiment" means that a particular described feature, structure, or characteristic is included in at least one embodiment of the present invention. Thus, appearances of the phrases "in one embodiment" or "in an embodiment" in various places throughout this specification do not necessarily all refer to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail in order to avoid obscuring aspects of the invention.

While the following description makes particular reference to television systems, it should be recognized that the present invention may be used in conjunction with any type of information system in which selectable options may be displayed on a display screen. Examples of such information systems include, but are not limited to, ITV systems, personal computers, and mobile computing devices, such as PDAs, webpads, cellular telephones, and the like.

Figure 1:
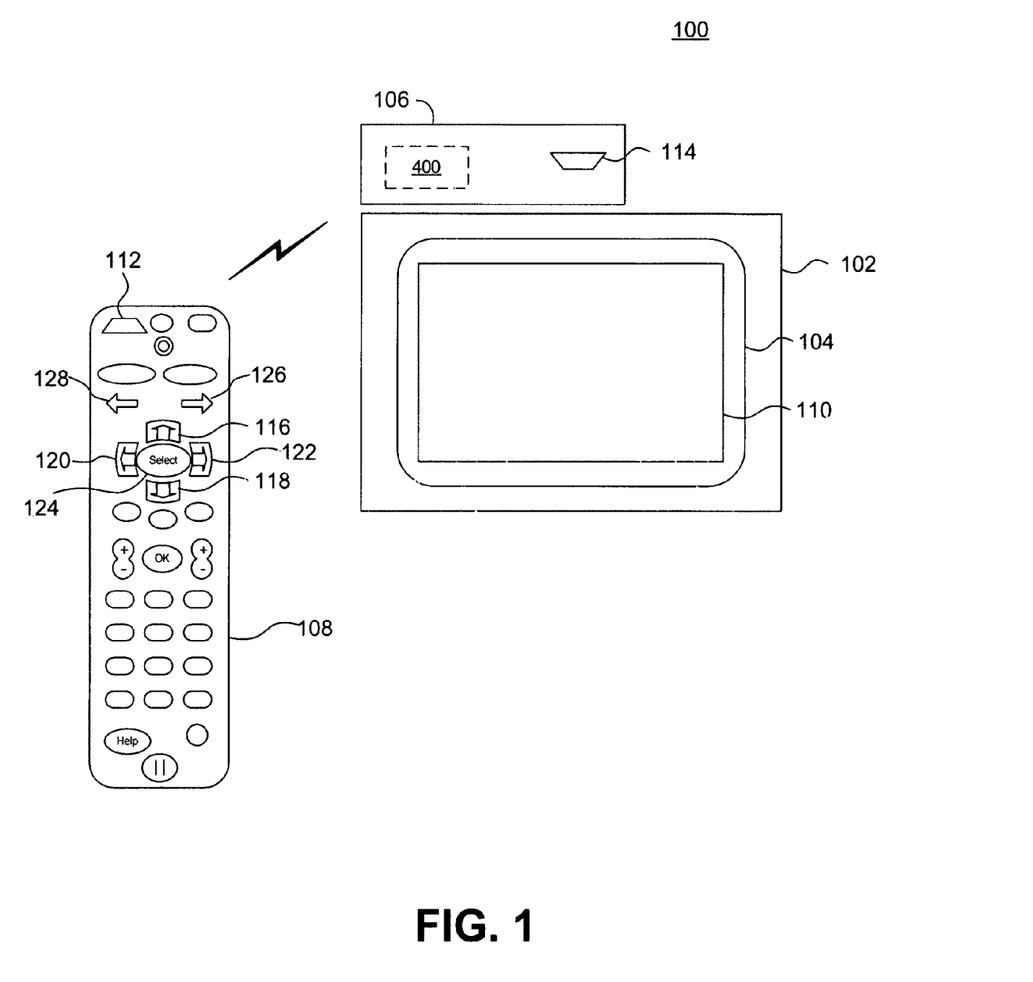
FIG. 1 is a block diagram of an ITV system.

Referring now to FIG. 1, there is shown a block diagram of an ITV system 100 according to an embodiment of the invention. In one configuration, the ITV system 100 includes a television (TV) 102 or other display device having a display screen 104, a client terminal 106, such as a set-top box (STB), and a remote control 108.

The STB 106 serves as a gateway between the TV 102 and a broadband communication network (not shown), such as a cable television network or a direct broadcast satellite (DBS) network. One commercially-available example of an STB 106 is the Motorola DCT5000® interactive set-top terminal.

The STB 106 receives encoded television signals and other data from the broadband network and processes the same for display on the display screen 104. The STB 106 may also include hardware and software for presenting a graphical user interface (GUI) 110 on the display screen 104 for operating the various functions and services of the STB 106. In alternative embodiments, the STB 106 may be integrated into the TV 102 or may be embodied within a personal computer (PC), mobile computing device, or the like.

The remote control 108 is provided for convenient remote operation of the STB 106 and the TV 102. The remote control 108 may include a wireless transmitter 112 for transmitting control signals to a wireless receiver 114 within the STB 106 using radio frequency (RF) or infrared (IR) techniques.

In addition, the remote control 108 may include a number of buttons or other similar controls. For instance, the remote control 108 may include an "Up" button 116, a "Down" button 118, a "Left" button 120, a "Right" button 122, and a "Select" button 124. In an embodiment, the remote control 108 may further include a "Forward" button 126 and a "Backward" button 128. Of course, a variety of other buttons or controls may be provided within the scope of the invention. In alternative implementations, the remote control 108 may be embodied as a keyboard, mouse, or other suitable input device.

An ITV system 100 typically provides access to a plurality of selectable options, such as channels, programs, applications, digital media files, etc. For instance, an ITV system 100 may provide access to literally hundreds of broadcast TV channels, pay-per-view (PPV) channels, music channels, and the like. Additionally, an ITV system 100 may provide access to a number of interactive channels or applications, including web browsers, e-mail programs, chat clients, personal video recorder (PVR) applications, contact directories, and the like. Furthermore, an ITV system 100 may store or provide access to stored PVR recordings, digital photographs, audio (MP3) files, or other forms of digital media.

Figure 2:
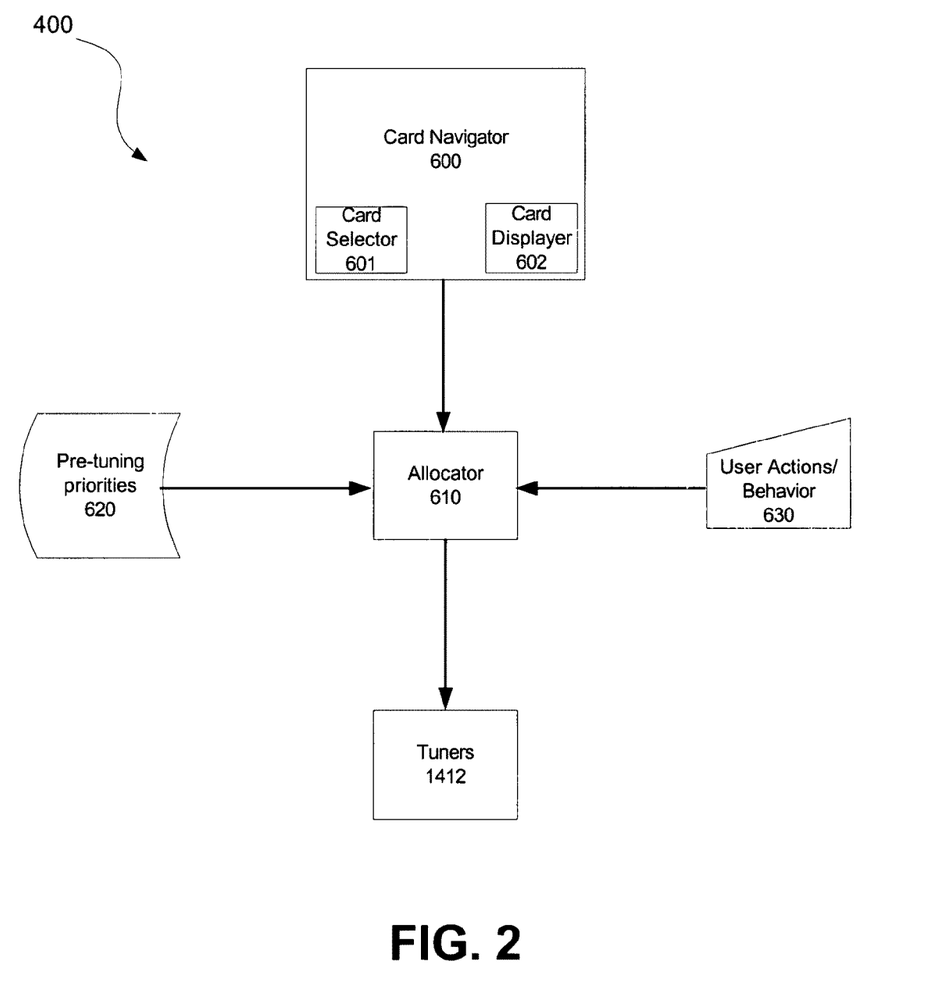
FIG. 2 is a block diagram illustrating a generalized embodiment of selected components of a system for contextual pre-tuning.

Referring to FIG. 2, there is shown a block diagram illustrating a generalized embodiment of selected components of a system 400 for contextual pre-tuning in, for example, the ITV system 100. As can be seen in FIG. 1, the system 400 may be implemented by components of the client terminal 106. Alternatively, the system 400 may be implemented by one or more client terminals 106 in a home or office networking environment. Alternatively, the system 400 may be implemented by components of a distribution center, such as a cable headend or the like, in a broadband communication network and serving the ITV system 100.

In one embodiment, the system for contextual pre-tuning comprises a card navigator 600. The nature and navigation of media program indicators, such as cards or selectable elements of electronic program guides, are more thoroughly discussed in commonly-owned U.S. patent application Ser. No. 10/097,174, filed Mar. 12, 2002, for "SYSTEM AND METHOD FOR FOCUSED NAVIGATION WITHIN AN INTERACTIVE TELEVISION USER INTERFACE", which application is incorporated herein by reference in its entirety. The card navigator, in turn, may comprise a card selector 601 and card displayer 602. The card displayer 602 enables the successive display of cards within the GUI 110. The card selector 601 serves to select a particular card, which may thereby cause one of a plurality of tuners 1412 (discussed below) to tune to a television program associated with the selected card.

In an embodiment, the system for contextual pre-tuning further comprises an allocator 610. The allocator 610 may process data in the form of pre-tuning priorities 620 and user channel selection history 630 that are available via, for example, the ITV system 100 illustrated in FIG. 1. In an embodiment, the pre-tuning priorities 620 are provided by an administrator and/or distributor of the system 100. In an embodiment, the pre-tuning priorities 620 may be provided by a user of the ITV system 100 via, for example, the GUI 110, thereby allowing the user to rank available pre-tuning priorities in order of precedence.

In an embodiment, the allocator 610 may process input in the form of a card selection from the card navigator 600. Based on one or more characteristics of the selected card, the pre-tuning priorities 620 enable the allocator 610 to identify one or more television channels or programs that the allocator 610 is to instruct one or more tuners 1412 to tune. In an embodiment, after processing the instructions received from the pre-tuning priorities 620, the allocator 610 instructs the required number of tuners 1412 to tune to the identified channels/programs.

Figure 3:
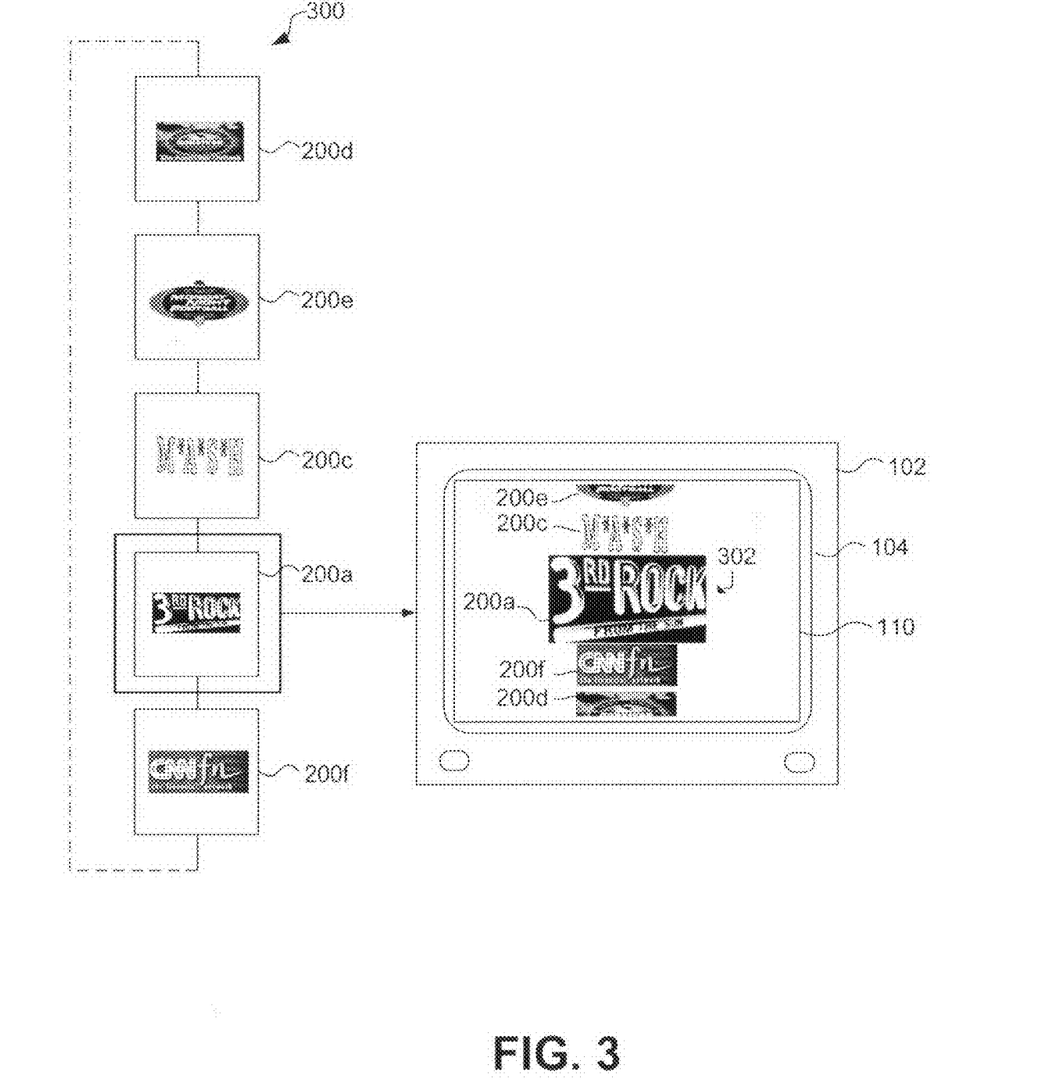
FIG. 3 is an illustration of focused navigation of a plurality of cards within a user interface.

The priorities 620 may comprise, for example, tuning to one or more channels represented by one or more cards adjacent to the selected card ("adjacent pre-tuning"). As shown in FIG. 3, one or more previous and next cards 200 within a sequence 300 may be displayed along an axis of the GUI 110 to provide the user with a more complete navigational context within the sequence 300. For example, at least a subset of the sequence 300 of cards 200 may be displayed along a vertical axis, with the active, or selectable, card 200a being displayed in the focus area 302. When a user activates one of the navigation buttons of the remote control 108 (e.g., the "Up" or "Down" buttons 116, 118), the displayed cards 200 in the sequence 300 may appear to shift or cycle downward or upward, respectively, with a new card (e.g., card 200c or 200f) entering the focus area 302.

Accordingly, if the top priority is adjacent pre-tuning, an available tuner 1412 will tune to a television program associated with a card 200 adjacent to the selected card 200. For example, if the card 200a within the focus area 302 is selected, one of the tuners 1412 may tune the program associated with the selected card 200a. Subsequently, an additional tuner 1412 will pre-tune to a television program associated with a card 200 (e.g., either card 200c or 200f) adjacent to the focus area 302 within which the selected card 200a is positioned. In an embodiment, the choice of which of the two programs is tuned may be governed by the direction along the sequence 300 in which the user was navigating prior to card selection. If a second additional tuner 1412 is available, each television program associated with both adjacent cards 200 may likewise be pre-tuned. Similarly, each third or more additional tuner may pre-tune one or more television programs associated with each card 200 in the sequence 300 in order of, for example, decreasing proximity along the sequence 300 from the selected card 200a.

The priorities 620 may further comprise tuning to one or more programs or channels that are included within a filtered group in which the channel or program represented by the selected card is likewise included ("filter pre-tuning"). The nature of channel/program filtering is more thoroughly discussed in commonly-owned U.S. patent application Ser. No. 10/260,208, filed on Sep. 30, 2002, titled "FILTERING BY BROADCAST OR RECORDING QUALITY WITHIN AN ELECTRONIC PROGRAM GUIDE," and issued as U.S. Pat. No. 7,350,157, which is incorporated herein by reference in its entirety.

Figure 4:
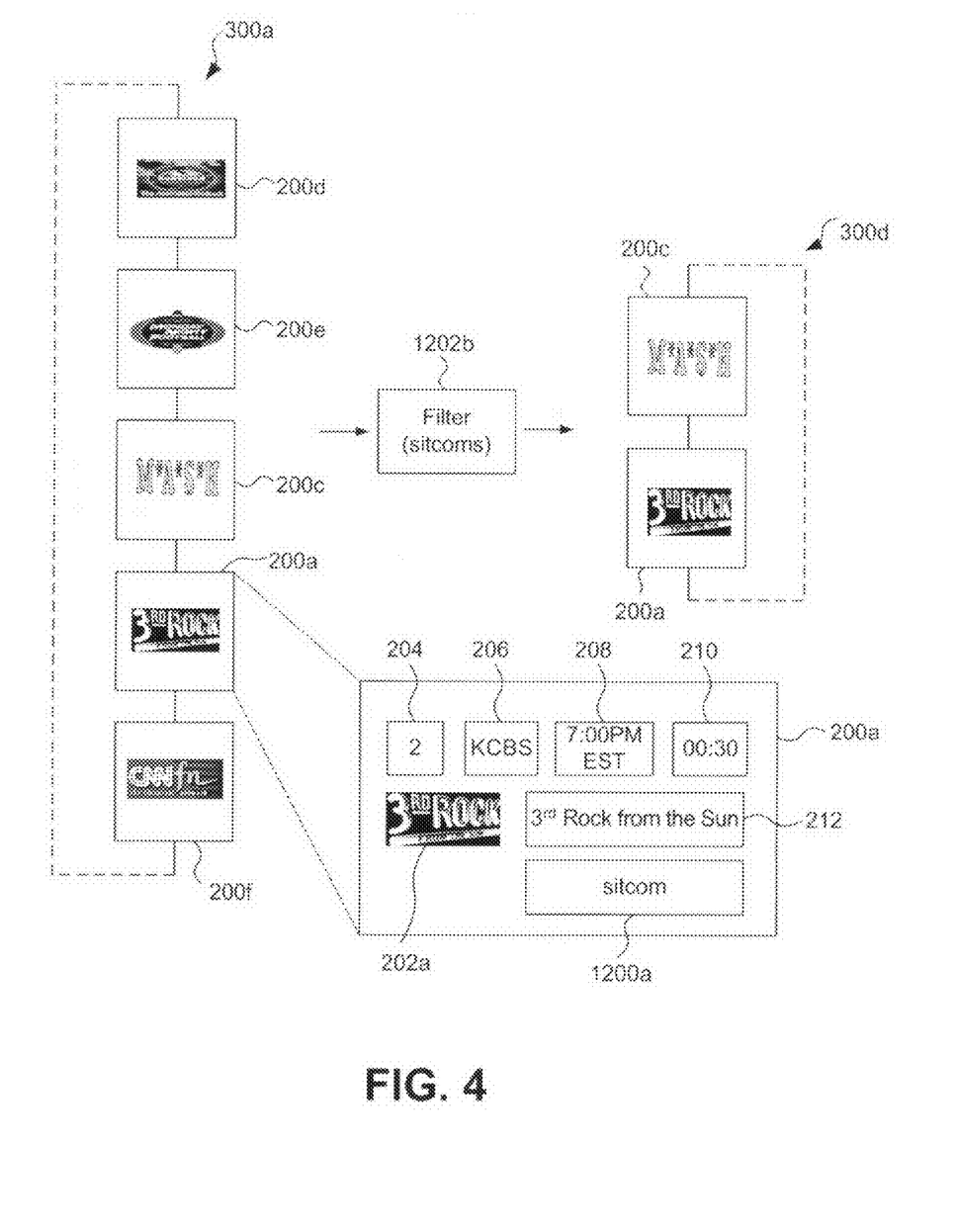
FIG. 4 is a block diagram of a sequence of cards being filtered according to tags associated with each card.

As depicted in FIG. 4, each card 200 may include one or more tags 1200. A tag 1200 may indicate a genre, type, function, or other characteristic of a card 200 or a represented option. A tag 1200 may be embodied as an XML tag, an object attribute, or other suitable indicator known in the art. As exemplified in FIG. 4, a tag 1200 may indicate a genre of a television program represented by a card 200a (e.g., a sitcom).

One or more filters 1202 may be provided for filtering sequences 300 of cards 200 based on the tags 1200. In one embodiment, a filter 1202 may include criteria, such as one or more search terms (e.g., keywords), search attributes, logical expressions, or the like, that may be compared with the tag(s) 1200 of each card 200 in a sequence 300. If a tag 1200 is compatible with the criteria, the corresponding card 200 may be retained or copied to a new sequence 300; otherwise, the card 200 may be removed or not copied.

As an example, a filter 1202b may only select cards 200 that have a "sitcom" tag 1200. As a result, a new sequence 300d may be created that includes cards 200a and 200c (e.g., $3^{rd}$ Rock from the Sun and M*A*S*H). In other embodiments, a new sequence 300 is not created, but the original sequence 300a is modified by application of the filter 1202.

Accordingly, if the top priority is filter pre-tuning, available tuners 1412 will tune to one or more television programs associated with cards 200 that are included within a filtered sequence in which a card associated with the channel or program represented by the selected card 200 is likewise included. For example, if the card 200a within the focus area 302 is selected, as illustrated in FIG. 3, one of the tuners 1412 may tune the program ("$3^{rd}$ Rock") associated with the selected card 200a. If the selected card 200a has been associated with a filtered sequence 300d, an additional tuner 1412 will subsequently pre-tune to a television program associated with a card 200c ("MASH") also associated with the filtered sequence 300d. In an embodiment, the choice of which of multiple programs associated with the filtered sequence 300d is tuned may be governed by the direction along the sequence 300 in which the user was navigating prior to card selection. As similarly described above, each additional tuner may pre-tune one or more additional television programs associated with each card 200 in a filtered sequence (e.g., 300d) in order of, for example, decreasing proximity along the sequence 300 from the selected card 200a.

The priorities 620 may further comprise tuning to one or more channels or programs that the user has previously tuned at the time of day at which the card is selected ("past-selection pre-tuning"). One embodiment of the system 100 will continually monitor and record the user's channel selection history 630, as illustrated in FIG. 2. This historical information may then be used by the allocator 610 to anticipate channels which the user will select. For example, the user may watch The Simpsons at 6:00 each evening on a regular basis. Accordingly, if the top priority is past-selection pre-tuning, selection of a card 200 at 6:00 will prompt the allocator 610 to cause one tuner 1412 to tune to the channel on which The Simpsons is broadcast. Similarly, multiple tuners 1412 may be employed to tune multiple programs that the user has historically viewed at the time of day at which a card 200 is selected.

In an embodiment, pre-tuning in accordance with each of the priorities may be simultaneously employed to the extent a sufficient number of tuners 1412 are available. For example, if the highest priority is adjacent pre-tuning, the second highest priority is filter pre-tuning, and there are three tuners 1412 available, then two tuners 1412 may be employed to pre-tune programs associated with the two cards 200 adjacent to the selected card 200, with the third tuner simultaneously employed to tune a program within the filter group of the selected card 200.

Figure 5:
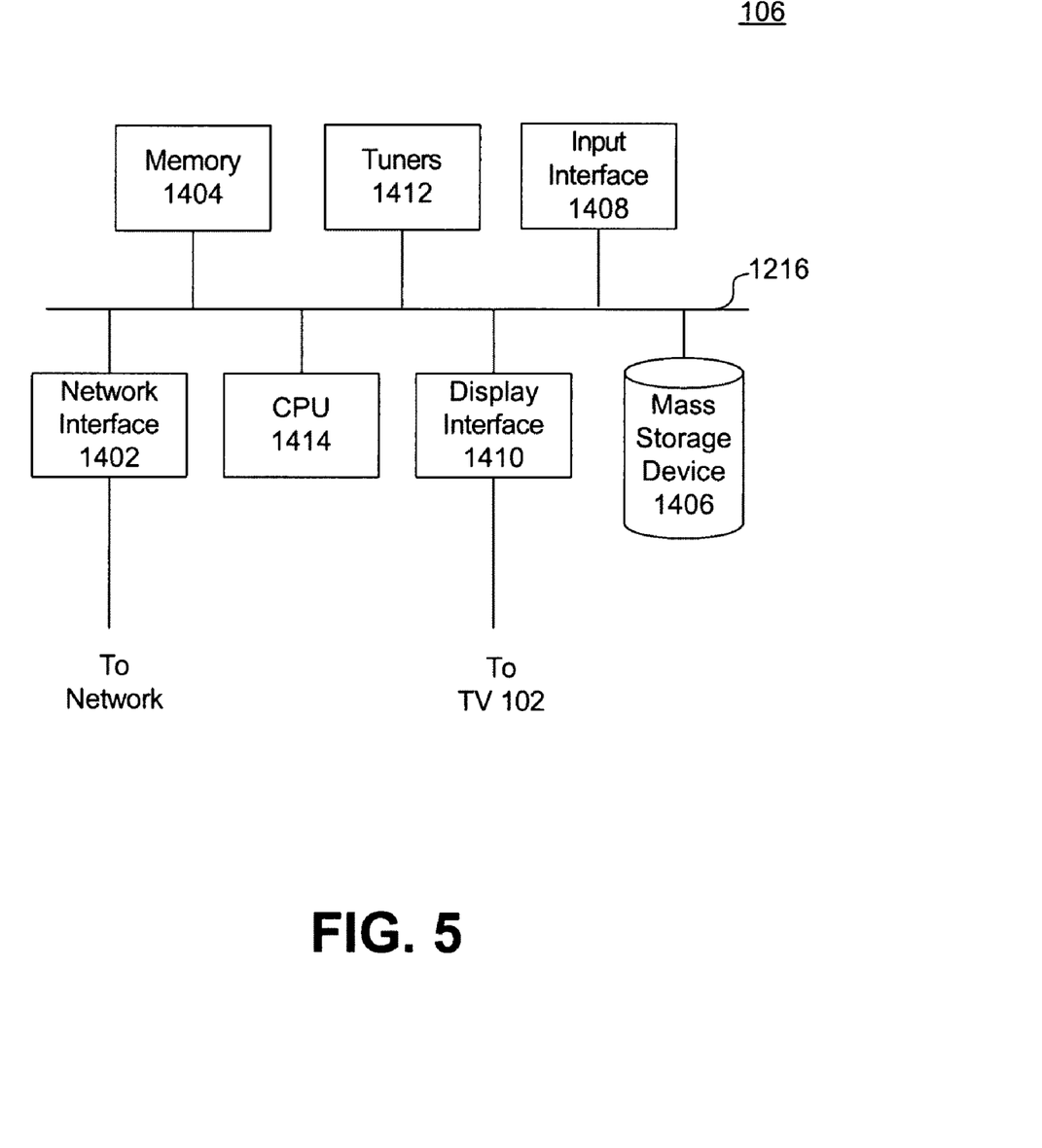
FIG. 5 is a block diagram of a set-top box (STB)

FIG. 5 is a schematic block diagram of an STB 106 according to an embodiment of the invention. The illustrated components may be logical or physical and may be implemented using any suitable combination of hardware, software, and/or firmware.

In one configuration, the STB 106 includes a network interface 1402 for communicating with a broadband network, such as a cable television network or a DBS (Direct Broadcast Satellite) network. The network interface 1402 may conform to the DOCSIS (Data Over Cable Service Interface Specification) or DAVIC (Digital Audio-Visual Council) cable modem standards. Additionally, the network interface 1402 may include standard circuitry for receiving MPEG (Moving Picture Experts Group) streams including multiplexed television programs and data from the broadband network.

One or more sequences 300 of cards 200 may be received by the interface 1402 from a server accessible via the broadband network or the Internet. Additionally, the network interface 1402 may be used to retrieve status indicators 702, such as sports scores, stock tickers, news headlines, and the like, which may be displayed on or near a card 200. Moreover, the network interface 1402 may be configured to receive one or more filters 1202. Such cards 200, indicators 702, and/or filters 1202 may be retrieved via HTTP, ATVEF triggers, or other mechanisms.

The STB 106 further includes a memory 1404, such as a random access memory (RAM) and/or read-only memory (ROM). The memory 1404 may store an operating system (OS) for the STB 106 (e.g., Windows CE® or Linux®), application program code, and various types of data. In one embodiment, the memory 1404 stores one or more sequences 300 of cards 200, as well as the pre-tuning priorities 620 and data pertaining to user channel selection history 630. In other embodiments, the sequences 300, priorities 620 and/or history 630 may be stored within a mass storage device 1406, such as a hard disk drive, optical storage device, or the like.

An input (user action) interface 1408 may be provided for receiving commands from an input device, such as a remote control 108. In one embodiment, the input interface 1408 may include or be associated with the wireless receiver 114 described in connection with FIG. 1. The input interface 1408 may detect user actions for card navigation and selection, such as the user pressing the "Up" or "Down" buttons 116, 118 on the remote control 108.

The STB 106 may further include a display (presentation) interface 1410 for generating a GUI 110 on an attached TV 102 or other display device. In addition, the display interface 1410 may be responsible for successively displaying cards 200 from one or more stored (and possibly filtered) sequences 300 in a focus area 302 of the GUI 110 in response to user action detected by the input interface 1408. Additionally, the display interface 1410 may be used to display television programs tuned by the STB 106.

One or more tuners 1412 may be included for demodulating and demultiplexing selected MPEG streams received by the STB 106 from the broadband network. The tuners 1412 may be used to tune to a particular one television program or several programs in response to a user selection of a card or cards 200, e.g., in response to the user pressing the "Select" button 124 or when the user "lingers" on a card 200 in the focus area 302. As such, a plurality of the tuners 1412 may be used to simultaneously tune a plurality of programs represented by cards 200 selected from, for example, the filtered sequence 300d.

A CPU 1414 controls the operation of the STB 106, including the other components described above, which may be in electrical communication with the CPU 1414 via a bus 1216. The CPU 1414 may be embodied as a microprocessor, a microcontroller, a digital signal processor (DSP) or other device known in the art. For instance, the CPU 1414 may be embodied as an Intel® x86 processor. The CPU 1414 may perform logical and arithmetic operations based on program code stored within the memory 1404 or the mass storage device 1406. Additionally, the card navigator 600 and allocator 610 may be implemented as software on one or more components of the CPU 1414. Of course, the card navigator 600 and allocator 610 may likewise be implemented on processing components other than the CPU 1414 and known in the art.

Of course, FIG. 5 illustrates only one possible configuration of an STB 106. Those skilled in the art will recognize that various other architectures and components may be provided within the scope of the invention. In addition, various standard components are not illustrated in order to avoid obscuring aspects of the invention.

Figure 6:
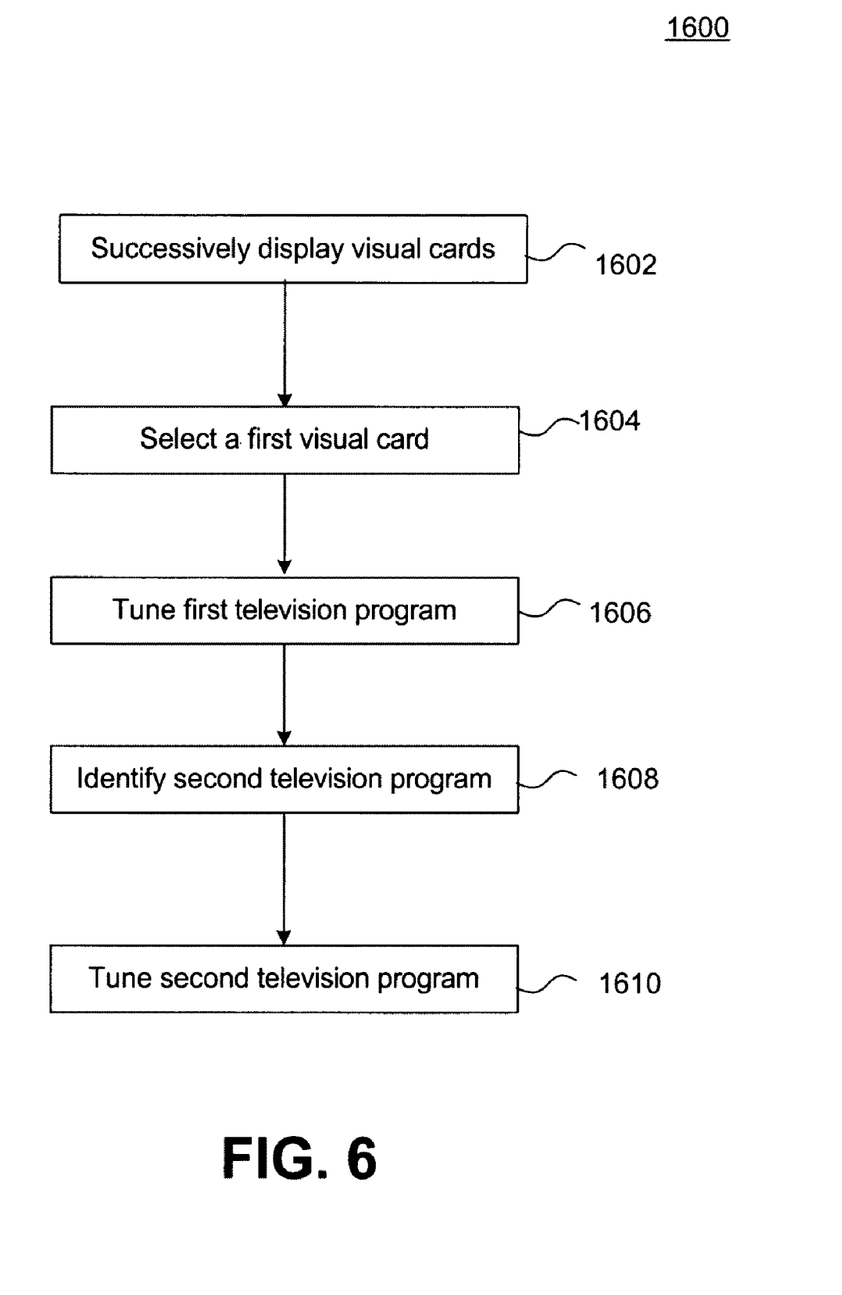
FIG. 6 is a flowchart of a method for focused navigation within a user interface.

Referring to FIG. 6, there is shown a flowchart of a method 1600 of contextual pre-tuning in, for example, the ITV system 100. The method 1600 begins by successively displaying 1602 a first set of visual cards 200 within a GUI 110. Each of the cards 200 includes a graphical representation of a programming option, such as a television program or channel. A first visual card 200 of the first set is selected 1604. By selecting 1604 the first visual card, a user may thereby view a television program associated with the first visual card. In order to view this associated television program, the program is tuned 1606 by a tuner 1412.

Based on a characteristic of the selected visual card, a second television program is identified 1608. Such a characteristic may comprise the position of the selected card 200 within a card sequence 300 for purposes of adjacent pre-tuning. Such a characteristic may alternatively comprise the inclusion of the selected card 200 within a filter card sequence (e.g., 300d) for purposes of filter pre-tuning. Such a characteristic may alternatively comprise the time of day at which the selected card 200 is selected for purposes of past-selection pre-tuning. Once the second television program is identified, the second television program is tuned 1610.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

The invention claimed is:

1. A method implemented on a multi-tuner receiver system, the method comprising:
    successively displaying a set of visual cards, each visual card of the set of visual cards comprising a graphical representation;
    selecting a visual card of the set of visual cards, the visual card being associated with a first television program;
    identifying, based on a characteristic of the selected visual card, a second television program; and
    tuning to the second television program.

2. The method of claim 1, wherein the graphical representation is of a television program.

3. The method of claim 1, further comprising tuning to the first television program.

4. The method of claim 1, wherein the characteristic comprises the positioning of the selected visual card within a user interface.

5. The method of claim 1, wherein the characteristic comprises the time at which the selected visual card is selected.

6. The method of claim 1, wherein the characteristic comprises a category to which the selected visual card belongs.

7. A method of contextual tuning, the method comprising:
    navigating a set of media program indicators;
    selecting an indicator of the set of indicators, the indicator being associated with a first television program;
    allocating, based on a characteristic of the selected indicator, an instruction to tune to a second television program; and
    tuning to the second television program.

8. The method of claim 7, further comprising tuning to the first television program.

9. The method of claim 7, wherein the characteristic comprises the positioning of the selected indicator within a user interface.

10. The method of claim 7, wherein the characteristic comprises the time at which the selected indicator is selected.

11. The method of claim 7, wherein the characteristic comprises a category to which the selected indicator belongs.

12. A receiver system, comprising:
    a card displayer successively displaying a set of visual cards, each visual card of the set of visual cards comprising a graphical representation;
    a card selector selecting a visual card of the set of visual cards, the visual card being associated with a first television program;
    an allocator identifying, based on a characteristic of the selected visual card, a second television program; and
    a first tuner tuning to the second television program.

13. The system of claim 12, wherein the graphical representation is of a television program.

14. The system of claim 12, further comprising a second tuner tuning to the first television program.

15. The system of claim 12, wherein the characteristic comprises the positioning of the selected visual card within a user interface.

16. The system of claim 12, wherein the characteristic comprises the time at which the selected visual card is selected.

17. The system of claim 12, wherein the characteristic comprises a category to which the selected visual card belongs.

18. A system for contextual tuning, comprising:
    a processor successively displaying a set of visual cards, each visual card of the set of visual cards comprising a graphical representation, the processor further selecting a visual card of the set of visual cards, the visual card being associated with a first television program, the processor further identifying, based on a characteristic of the selected visual card, a second television program; and
    a first tuner tuning to the second television program.

19. The system of claim 18, wherein the graphical representation is of a television program.

20. The system of claim 18, further comprising a second tuner tuning to the first television program.

21. The system of claim 18, wherein the characteristic comprises the positioning of the selected visual card within a user interface.

22. The system of claim 18, wherein the characteristic comprises the time at which the selected visual card is selected.

23. The system of claim 18, wherein the characteristic comprises a category to which the selected visual card belongs.

24. A computer program product comprising program code for performing a method implemented on a multi-tuner receiver system, the method comprising:
    successively displaying a set of visual cards, each visual card of the set of visual cards comprising a graphical representation;
    selecting a visual card of the set of visual cards, the visual card being associated with a first television program;
    identifying, based on a characteristic of the selected visual card, a second television program; and
    tuning to the second television program.

25. The product of claim 24, wherein the graphical representation is of a television program.

26. The product of claim 24, further comprising tuning to the first television program.

27. The product of claim 24, wherein the characteristic comprises the positioning of the selected visual card within a user interface.

28. The product of claim 24, wherein the characteristic comprises the time at which the selected visual card is selected.

29. The product of claim 24, wherein the characteristic comprises a category to which the selected visual card belongs.

30. A receiver system, comprising:
    means for successively displaying a set of visual cards, each visual card of the set of visual cards comprising a graphical representation;
    means for selecting a visual card of the set of visual cards, the visual card being associated with a first television program;
    means for identifying, based on a characteristic of the selected visual card, a second television program; and
    means for tuning to the second television program.

31. The system of claim 30, wherein the graphical representation is of a television program.

32. The system of claim 30, further comprising means for tuning to the first television program.

33. The system of claim 30, wherein the characteristic comprises the positioning of the selected visual card within a user interface.

34. The system of claim 30, wherein the characteristic comprises the time at which the selected visual card is selected.

35. The system of claim 30, wherein the characteristic comprises a category to which the selected visual card belongs.

* * * * *